United States Patent Office 3,442,739
Patented May 6, 1969

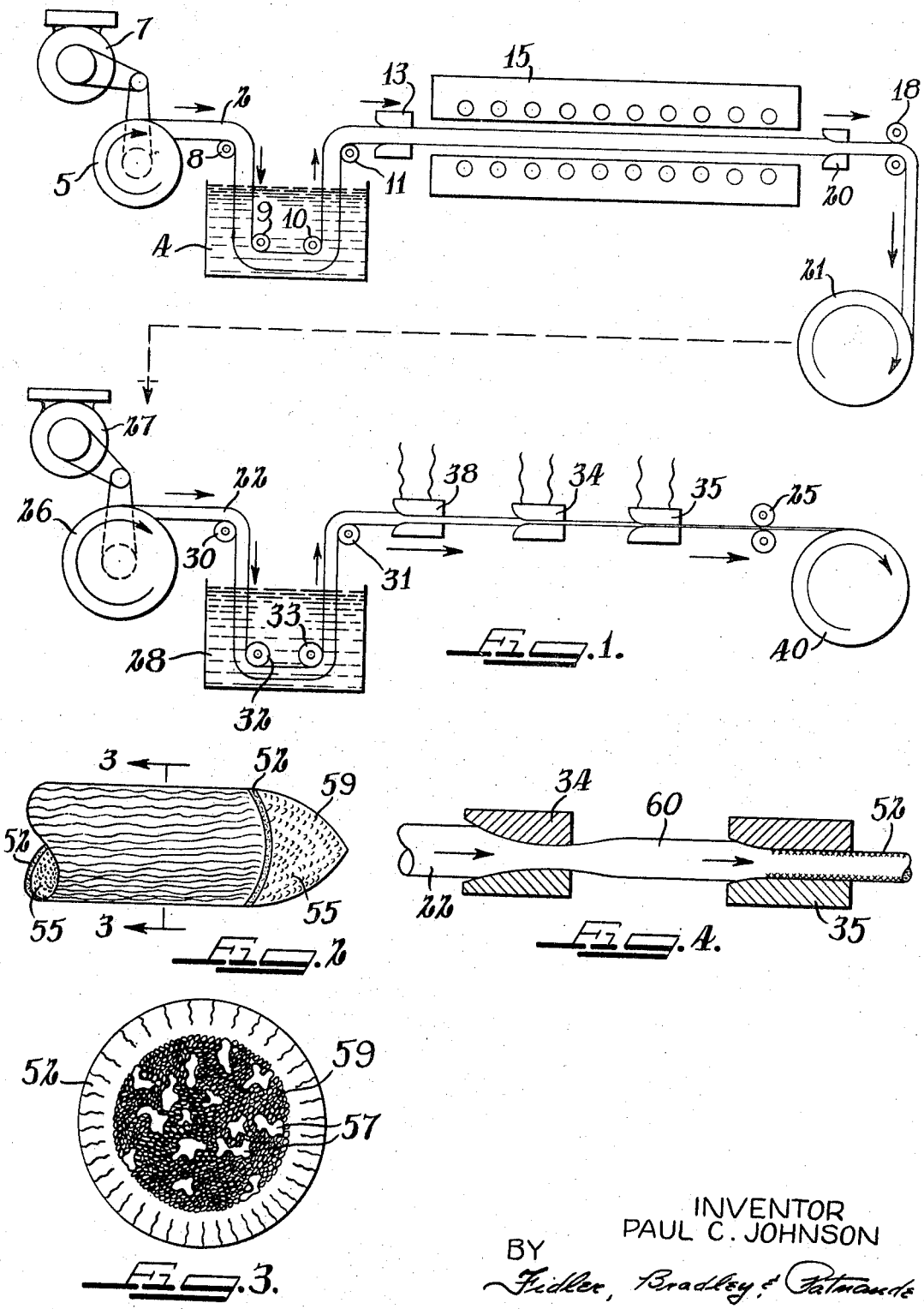

3,442,739
FIBROUS WICK
Paul C. Johnson, Janesville, Wis., assignor to The Parker Pen Company, a corporation of Wisconsin
Filed June 2, 1965, Ser. No. 460,631
Int. Cl. D02j 1/00, 11/00
U.S. Cl. 156—180    10 Claims

ABSTRACT OF THE DISCLOSURE

Fibrous wicking for pen points having a porous core surrounded by a nonporous peripheral layer, is produced by bonding together nylon fibers of a continuous filament parallelized yarn bundle at randomly spaced junctures along their lengths with an epoxy resin and thereafter sizing the bundle of intermittently bonded fibers at a temperature sufficient to melt only the outermost nylon fibers which are thereby amalgamated with an epoxy matrix throughout their entire length to form nonporous sheath which is bonded at randomly spaced intervals to outermost fibers of the porous core.

---

The present invention relates generally to synthetic fiber wicking for use as fluid marking points. More particularly, it relates to a new improved nylon fiber wick and to a new and improved process for fabricating such wick.

Writing or ink applicators using wick-type writing nibs or stylus points are well known in the prior art. Such wicks have ordinarily been made of a felt-like material having a multiplicity of interconnected capillary passageways extending therethrough for holding a supply of ink and for feeding ink from a reservoir to the writing end at the extremity of the wick. Another well known type of marking wick is made of a textile material which also consists of a multiplicity of interconnected capillary passageways extending therethrough.

Felt tip or woven tip marking pens have a number of disadvantages which increase in importance when attempts are made to design such wicks for normal writing in competition with conventional fountain pens and ball point pens where the stylus point must be relatively small and sharp and the flow of ink must be uniform. Among these disadvantages is the fact that the writing tips on such prior art wicks have tended to fray so that after relatively little use a sharp edged race is not made as the wick is drawn across the writing surface. Moreover, the flow of ink through such wicks varies from one wick to another so that precise control of the ink flow characteristics of the instrument is extremly difficult if not impossible. In addition, such wicks tend to dry out so that it is difficult to restart the flow of ink therethrough after the pen has lain idle for an extended period of time. An effort has been made heretofore to minimize these disadvantages, but the resulting wicks have generally been quite rigid and offer a substantial frictional resistance to normal writing so that the writing instrument does not have the desirable "feel" to which the public has become accustomed.

Therefore, an object of the present invention is to provide a new and improved writing wick adaptable for use with aqueous types of ink, which has good fraying resistance, close flow control, less dry-out and more brush-like softer feel.

Another object of the present invention is to provide a new and improved synthetic wick which minimizes some of the disadvantages of the prior art wicks as discussed hereinabove.

Another object of the present invention is to provide a new and improved process for fabricating writing wicks. In broad outline, the above and other objects and features of the present invention are attained by providing a novel process for treating continuous nylon fiber filaments to produce a novel wicking material suitable for use in writing instruments. Suitable nylon fiber filaments which are available commercially are nylon 6 obtained by polycondensation of caprolactam and nylon 6, 6 obtained by the condensation of hexamethylene diamine with adipic acid. Both types of nylon fibers are commercially available in the form of continuous filament cordage yarn in a variety of lengths and deniers. A typical type 6 nylon is the product sold by Allied Chemical & Die Company under the trademark "CAPROLAN."

In accordance with this invention, a body of nylon fibers are first coated with a film of an epoxy resin together with a suitable catalyst. Curing produces intermittent point contact bonding beween individual fibers to form agglomerates so that when the resin is hardened, groups of fibers are bonded together at numerous points of contact along their lengths. Thereafter, the partially bonded bundle of fibers is passed through a heated orifice at a temperature sufficient to melt the outermost fibers which are thereby amalgamated with the epoxy matrix to form a nonporous sheath around the core of porous partially bonded fibers within. It will be understood that while the sheath is generally nonporous there may be a few randomly dispersed openings therein. However, these few openings in no way affect the operation or efficiency of the wick and, therefore, the term "nonporous," as used herein, has its commonly accepted meaning and signifies that the sheath around the core is substantially nonporous and is not meant to connote complete nonporosity in the absolute sense. The resultant product is a composite wick structure wherein partially bonded interior fibers and fiber agglomerates within the core are covered by a peripheral chemically amalgamated nonporous sheath. The core fibers, being intermittently bound, impart a smooth feel and brush-like quality when the wick is employed as a pen nib. Dryout is minimized due to the monolithic, nonporous, sheath. The cured epoxy resin, because of its adhesive properties and high modulus serves to rigidize the sheath and unify the core. Fiber unification is further increased by co-reaction of the polyamide with epoxy to yield a chemically cross-linked structure.

Further objects and advantages and a better understanding of the present invention may be had by reference to the following detailed description taken in connection with the accompanying illustrative drawing, in which:

FIGURE 1 is a diagrammatic view showing the various stages in the preparation of the fiber wicking of the present invention and the apparatus therefor;

FIGURE 2 is an enlarged perspective view of a short length of the final product produced by the process illustrated in FIG. 1, which has been cut off and pointed at one end;

FIGURE 3 is an enlarged cross-sectional view of the final product shown in FIG. 2, taken on the line 3—3 of FIG. 2, showing the nonporous amalgamated sheath covering the porous heterogeneous fiber agglomerate interior; and FIGURE 4 is a cross-sectional view of an apparatus provided by the invention for sizing a partially bonded body of nylon fibers and fusing the outermost fibers with an epoxy matrix to form an amalgamated peripheral layer.

The process of the present invention as more particularly described hereinafter produces a nonuniformly porous, open capillary, semi-rigid wick which exhibits slow dry-out characteristics and which can be used as a pen nib or stylus point with fast wet-out qualities for the transfer of liquid writing ink from a reservoir to an abutting writing surface. The good wear characteristic of the wick is partly attributable to the fact that the individual fibers making up the wick are oriented in essentially a longitudinal direction so that they extend substantially perpendicular to the paper at the point of contact during writing. Accordingly, any wear must occur at the fiber ends. The slow dry-out characteristic is attributable to the composite, nonuniformly bonded structure which also provides durability.

In accordance with the method of the present invention a sliver of nylon filament fibers in substantially parallel relationship with essentially all of the fibers in longitudinal contact with one another, is treated to apply a thin film of epoxy resin to substantially all of the fibers in the bundle. The resin is hardened by the use of a suitable catalyst to bond the filaments to each other at randomly spaced apart junctures therebetween throughout the bundle. This can be accomplished in a variety of ways using conventional equipment. For example, the adhesive can be applied by passing a continuous bundle of nylon fibers through a coating bath using conventional feed, guide and drawing rollers as are well known in the textile industry. In this manner the individual filaments can be coated with a solution containing epoxy resin with a catalyst present in a suitable solvent. The solvent is thereafter removed as by flashing off in a drier to produce a partially bonded sliver of fibers. The fibers are not bonded together along their entire length because they are not strictly parallel and various points or portions along the length of the fibers or filaments are in closer contact than other points.

Generally, the wicking will be fabricated in the shape of a cylindrical rod. If desired, however, this rod can be square, rectangular or have any other desired cross-sectional configuration. The shaping is best accomplished by passing the continuous bundle of filaments through an unheated forming die after being impregnated with the epoxy carrying solution and before the solvent is removed.

Upon leaving the drier, the sliver of fibers is wound upon a spool for storage at room temperature, e.g., 73° F. or heated until curing of the epoxy resin has taken place. The pre-bonded wicking is then passed through one or more heated orifices where the epoxy in the peripheral layer is fused with the outermost nylon fibers to produce a smooth sheath enclosing the inner fibers of the bundle. The orifices are sized for close-fitting application of heat to the surface filaments in the shaped bundle with some compression or compaction of the bundle of filaments taking place at this stage of the operation. Finally, the wicking is passed to a cutting stage where it is cut to short lengths and can be pointed if desired.

While the present invention contemplates the use of any polymer filament having long chain synthetic polymeric amide groups as an integral part of the main polymer chain, it is preferred to use nylon 6 fibers obtained by polycondensation of caprolactam. This fiber has a tensile strength in the range of 73,000–120,000 lbs./sq. in. and a melting point of approximately 420° F.

Any of the well known epoxy resins obtained by the condensation of phenol, acetone and epichlorohydrin can be used to bond together the nylon fibers being treated. Most advantageously one of the intermediate molecular weight "EPON" resins will be utilized. These are condensation polymers of epichlorohydrin and bisphenol-A which harden to form clear, tough polymers with high physical strength and excellent chemical resistance in the presence of conventional amine curing agents.

The nylon fiber filaments can be coated with an epoxy resin in any convenient manner. Advantageously, such coatings are applied by forming a solvent solution of the resin and simply immersing the sliver of nylon fibers therein until impregnation takes place. This can be accomplished by the use of vacuum or pressure or under atmospheric conditions as desired. Suitable solvents for epoxy resins are well known; for example, methyl ethyl ketone. A suitable catalyst, such as a conventional liquid polyamine curing agent, can be added directly to the dilute solution of epoxy resin in MEK.

Referring in particular to figure

Referring in particular to FIGURE 1 of the drawing, a sliver 2 of continuous filament nylon fibers is fed into an impregnation bath 4 which contains an epoxy resin solution. The sliver passes from spool 5 driven by motor 7 over guide roll 8, under guide rolls 9 and 10 submerged in the solution in bath 4, and then upwardly out of the bath over guide roll 11. It then passes through a rough sizing die 13 preferably at room temperature where excess impregnating solution is wiped off and it is shaped as desired. Thereafter the body of nylon fibers coated with a solution of epoxy resin and suitable catalyst is drawn through a heating zone 15 by means of drawing rollers 18. Only minimum tension is applied to thereby reduce stretching at this stage of the fabrication.

Various concentrations of epoxy resin-catalyst systems in suitable solvents can be utilized to coat the nylon fibers. Most advantageously, concentrations in the range of from 5 to 25% solids (epoxy plus agent) should be employed. Concentrations near the lower limit, i.e., in the range of 5 to 18% yield softer brush-like wick points, whereas concentrations in the range of 18 to 25% are preferred where firmer wick points are desired. The amount of epoxy picked up is preferably kept to a minimum to avoid attendant encapsulation of the fibers. For this reason relatively shorter impregnation times are used with the more concentrated solutions of epoxy. The heating zone 15 can be a conventional drier heated by means of electrical coils, lamps or the like to a temperature sufficient to drive off the solvent and deposit epoxy on the individual fibers, particularly at points of contact. Generally, this drier will be operated at a temperature in the range of about 300° F. to 350° F.

In some instances it may be desirable to pass the coated fibers through a heated sizing die 20 as the sliver leaves the drier. Sizing at this stage can be optionally employed where close control of cross-sectional dimensions is important. If utilized, the die 20 should be heated to a temperature approximately the same as the drier temperature. Preferably, the treated stock is then stored on a spool 21 at room temperature for approximately 12 hours until curing of the epoxy has taken place. Curing can be accelerated, if desired, by using an additional oven.

The sliver of pre-bonded fibers is then pulled from a storage spool through a hot sizing die heated to a temperature sufficient to melt the outermost nylon fibers and thereby form an amalgamated nylon-epoxy layer in the form of a sheath around the interior porous structure. FIGURE 1 shows a modified embodiment of the invention in which a sliver of pre-bonded fibers 22 is pulled by means of drawing rollers 25 from storage spool 26 driven by motor 27, through a dip tank 28 containing a blocking solution which is applied as a coating to the sliver of pre-bonded fibers to facilitate sizing.

It has been found that the die sizing of the epoxy-nylon composite can pose a serious problem as a result of the epoxy sticking and plugging the die orifice. One way to avoid the problem is to use a Teflon die to form the amalgamated sheath on the wick. In a modified embodiment, the problem has been avoided by the discovery that it is possible to use a thermoplastic solvent coating as a blocking agent on the pre-bonded stock material. Suitable blocking agents are those which in the solid phase are thermoplastic, compatible with the nylon and epoxy in the amalgamated sheath, and have a softening temperature close to that of the nylon. Suitable solvents are those having a high vapor pressure which do not break down the cross-linked epoxy or solvate the nylon.

A blocking agent system which meets the above requirements is one consisting of methyl ethyl ketone, water and a phenoxy thermoplastic polymer. Phenoxy polymers are polyhydroxy ethers derived from epichlorohydrin and bisphenol A. They are thermally stable with an average molecular weight of approximately 30,000 and contain no reactive epoxy groups. A preferred composition is one consisting of in the range of 0.5 to 5% by weight phenoxy, 1 to 3% water and MEK making up the remainder.

In the process illustrated in FIG. 1, the blocking agent is applied to a sliver of pre-bonded fibers 22 by passing the sliver over guide roll 30, under guide rolls 32 and 33 submerged in the blocking solution in dip tank 28 and then over roll 31 upwardly out of the solution through a pair of heated sizing dies 34 and 35. If desired, excess solvent can be removed from the treated stock emerging from the dip tank by passing it through a rough sizing die 38 heated to a temperature of approximately 300° F. Advantageously, both sizing dies 34 and 35 can be chrome plated. Die 34 is heated to a temperature near the melting point of the nylon (420° F.). Die 35 should be held at a temperature which is preferably below 180° F. Upon leaving die 34 the solvent of the blocking solution is flashed off leaving a thin protective thermoplastic film 60 on the wicking which then undergoes a slight expansion which is believed to be due to the solvent escaping. The amalgamated sheath 52 is developed in die 35 to produce the finished product which can be stored, for example, on spool 40.

While the roll of the polymeric blocking agent is not fully understood, it is believed that upon immersion in the methyl ethyl ketone-phenoxy solution that some of this solution penetrates the wick and is retained within the interior capillaries. Immersion times in the MEK solution in the order of 20–60 seconds induce a partial interfacial weakening of the bonds formed by the epoxy binder. Subsequent passage through the heated die converts the solvent to a vapor which weakens the interior bond developed between the nylon fibers and the epoxy matrix, which bond initially is not of a very high order. Upon applying a compressive force to a piece of pointed wicking, the fibers will now open up to produce a very smooth soft marking tip with soft brush-like qualities, plus the overall rigidity due to the fused sheath. The result is that within a matter of minutes after ink is inroduced to this wick, it exhibits a performance level obtainable only after several hours usage by wicking made without a blocking solution.

A cut and pointed piece of wicking prepared in accordance with the present invention is shown in FIGURE 2 illustrating the structure obtained which consists of a non-porous amalgamated sheath 52 with a porous heterogeneous fiber agglomerate interior 55. As can be seen more clearly in FIGURE 3, capillaries 57 are introduced not solely between the individual fibers but rather the fiber agglomerates 59. Porosity of the final wicking can be closely controlled by adjustment of the solids content of the binder solution, the number and diameter of the nylon fibers, and the tension and pull rate through the sizing dies and heat tunnel.

EXAMPLES

The various aspects of the invention described in detail hereinabove are illustrated further by the following specific examples. It is to be understood that there is no intention to limit the invention to the specific forms and examples disclosed, but, on the contrary, the invention covers all modifications, alternatives, equivalents and uses following within the spirit and the scope of the invention and as expressed in the appended claims.

Example I

In this example a binder solution was prepared by mixing together 7.0% by weight Epon 828 epoxy resin, 3.0 wt. percent of Epon T–1 curing agent and 90.0 wt. percent of methyl ethyl ketone. The fiber phase consisted of 2448 continuous type 6 nylon filaments plied together to make a 15,000 denier parallel yarn bundle.

The 15,000 denier yarn bundle was then drawn through the epoxy solution across bars and up into a vertical, electrically heated, 4-ft. tube furnace operating at 380° F. Pull rates through the furance were maintained at 20 inches per minute. Upon emerging from the furnace the semi-rigid sliver of yarn was drawn through a 0.085 inch diameter cold funnel-shaped metal die to insure a circular cross-section. More than one die can be employed if close control of dimension is required. Optionally, these dies can be heated to a temperature in the range of about 380–400° F. The partially fused stock was then wound on a storage drum and allowed to cure approximately 24 hours at room temperature before the die sizing operation was commenced.

A blocking agent solution was prepared by dissolving 1.5% by weight phenoxy natural thermoplastic polymer (Union Carbide Plastics Co.) in methyl ethyl ketone. The solution had a solids content of 1.5% by weight and contained approximately 2–3% water. The cured epoxy/nylon wicking from step 1 was pulled off the storage roll into a dip tank containing the blocking solution and upon emerging from the tank was drawn through three funnel-shaped metal sizing dies. The first die had a minimum diameter of 0.085 inch and was electrically heated to a temperature of 180° F. The second die was electrically heated to 420° F. and had a diameter of 0.077 inch. The third die having a diameter of 0.077 was operated as a cold die at a temperature not greater than 180° F.

The fused stock was drawn through the blocking solution and the three dies at a constant pull rate of 6.5 inches per minute resulting in total immersion of the fused stock in the blocking solution for a period of 30–40 seconds. The sized wicking had a final diameter of 0.077 inch and an apparent density in the range of 0.80–0.84 gms. per cubic centimeter.

The finished wicking was subsequently cut into short lengths and pointed to produce a soft nylon wick pen nib which, when tested, was found to exhibit smooth brushlike qualities when used in a writing instrument with a conventional aqueous-type ink.

Example II

Nylon wick pen nibs which are firmer than the nibs fabricated in the manner of Example I have been produced in accordance with the present invention by utilizing more concentrated binder and blocking solutions. In a series of experiments pen nibs have been made and tested successfully using binder solutions having a solids content (Epoxy plus agent) in the range of 18 to 25 percent by weight and blocking solutions containing in the range of 2 to 5 wt. percent phenoxy polymer. Nylon yarn employed in these tests contained in the range of 1,000 to 4,000 fibers (15,000–25,000 denier). Firm pen wicking can be produced in the manner of Example I using binder solution pull rates in the range of 15–30 inches per minute and blocking solution pull rates in the range of 5–15 inches per minute.

Example III

In another embodiment of the instant invention, intermediate softer feeling wick points have been produced by subsequent modification of finished pointed wicking obtained by the process of Example II. This is accomplished in a post-treatment step using the finished, cut, pointed wicking of Example II, by immersing the wicking for a period of from about 10 to 15 minutes in a softening solution consisting of deionized water and a wetting agent, e.g., 99.8% deionized water and 0.2% Aerosol OT–75 wetting agent. Preferably the softening solution will be heated, for example, to a temperature of approximately 200° F. After soaking in the softening solution, the wick points are drained and air or oven dried to produce the final product which has a high brush-like quality when used in a writing instrument.

What is claimed is:

1. A method of fabricating wicking for pen points from continuous nylon fiber, which comprises,
   treating a bundle of continuous nylon fiber filaments randomly oriented primarily in a longitudinal direction with an epoxy resin to bond said fibers together at randomly spaced junctures along their lengths, and passing the bundle of intermittently bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

2. A method of fabricating wicking for pen points from continuous nylon fiber, which comprises, treating a bundle of continuous nylon fiber filaments randomly oriented primarily in a longitudinal direction with an epoxy resin to bond said fibers together at randomly spaced junctures along their lengths, immersing the bundle of intermittently bonded fibers in a solvent solution of a phenoxy thermoplastic polymer, drying the fiber bundle to remove the solvent for the phenoxy polymer, and passing the bundle of intermittently bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

3. A method of fabricating wicking for pen points from continuous nylon fiber, which comprises, passing a bundle of continuous nylon fiber filaments randomly oriented primarily in a longitudinal direction through a solvent solution of epoxy resin, drying the bundle of nylon fibers to remove said solvent and deposit epoxy resin on the surface of individual fibers, curing said epoxy resin to bond said fibers together at randomly spaced junctures along their lengths, and passing the bundle of intermittently bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

4. A method of fabricating wicking for pen points from continuous nylon fiber, which comprises, passing a bundle of continuous nylon fiber filaments randomly oriented primarily in a longitudinal direction through a solvent solution of epoxy resin, said solution of epoxy resin containing a catalyst suitable for curing the epoxy at room temperatures, drying the bundle of nylon fibers to remove said solvent and deposit epoxy resin on the surface of individual fibers, curing said epoxy resin to bond said fibers together at randomly spaced junctures along their lengths, and passing the bundle of intermittently bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

5. A method of fabricating wicking for pen points from continuous nylon fiber, which comprises, passing a bundle of continuous nylon fiber filaments randomly oriented primarily in a longitudinal direction through a solvent solution of epoxy resin, said solution of epoxy resin containing a catalyst suitable for curing the epoxy at room temperatures, pulling the bundle of nylon fibers through an unheated forming die to establish a predetermined cross-sectional configuration, drying the bundle of nylon fibers to remove said solvent and deposit epoxy resin on the surface of individual fibers, curing said epoxy resin to bond said fibers together at randomly spaced junctures along their lengths, and passing the bundle of intermittently bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

6. A method of fabricating wicking for pen points from continuous nylon fiber, which comprises, passing a bundle of continuous nylon fiber filaments randomly oriented primarily in a longitudinal direction through a solvent solution of epoxy resin, drying the bundle of nylon fibers to remove said solvent and deposit epoxy resin on the surface of individual fibers, curing said epoxy resin to bond said fibers together at randomly spaced junctures along their lengths, immersing the bundle of intermittently bonded fibers in a solvent solution of a phenoxy thermoplastic polymer, drying the fiber bundle to remove the solvent for the phenoxy polymer, and passing the bundle of intermitenttly bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

7. A method of fabricating wicking for pen points from continuous nylon fiber, which comprises, passing a bundle of continuous nylon fiber filaments randomly oriented primarily in a longitudinal direction through a solvent solution of epoxy resin, said solution of epoxy resin containing a catalyst suitable for curing the epoxy at room temperatures, pulling the bundle of nylon fibers through an unheated forming die to establish a predetermined cross-sectional configuration, drying the bundle of nylon fibers to remove said solvent and deposit epoxy resin on the surface of individual fibers, curing said epoxy resin to bond said fibers together at randomly spaced junctures along their lengths, immersing the bundle of intermittently bonded fibers in a solvent solution of a phenoxy thermoplastic polymer, drying the fiber bundle to remove the solvent for the phenoxy polymer, and passing the bundle of intermittently bonded fibers through a sizing die heated to a temperature sufficient to melt only the outermost nylon fibers, whereby said outermost nylon fibers are fused to each other in an epoxy matrix throughout their entire length to form an amalgamated sheath which is bonded to outermost fibers of the core at randomly spaced intervals to form a smooth, unitary, relatively rigid wick having a porous core.

8. The method in accordance with claim 2 wherein the solvent solution of a phenoxy thermoplastic polymer contains in the range of from 0.5 to 5.0 percent solids.

9. The method in accordance with claim 3 wherein the solvent solution of epoxy resin contains in the range of from 5 to 25 percent solids.

10. The method in accordance with claim 1 wherein the resultant product is subsequently treated by immersion in a solution of a wetting agent.

References Cited

UNITED STATES PATENTS

| | | | |
|---|---|---|---|
| 2,688,380 | 9/1954 | MacHenry | 183—44 |
| 2,962,468 | 11/1960 | Groves | 260—42 |
| 3,015,595 | 6/1962 | Moser et al. | 154—46 |
| 3,190,294 | 6/1965 | Dunlap | 131—208 |
| 3,203,025 | 8/1965 | Schruer | 15—563 |
| 3,224,453 | 12/1965 | Mahoney et al. | 131—208 |
| 3,232,268 | 2/1966 | Price et al. | 118—234 |

EARL M. BERGERT, *Primary Examiner.*

D. J. FRITSCH, *Assistant Examiner.*

U.S. Cl. X.R.

401—198